(No Model.) 2 Sheets—Sheet 1.

J. P. FOULKS.
AIR MOTOR.

No. 500,877. Patented July 4, 1893.

Witnesses,

Inventor,
John P. Foulks
By Dewey & Co.
attys (No Model.)  2 Sheets—Sheet 2.

J. P. FOULKS.
AIR MOTOR.

No. 500,877. Patented July 4, 1893.

Witnesses,

Inventor,
John P. Foulks
By Dewey & Co.
Attys

UNITED STATES PATENT OFFICE.

JOHN P. FOULKS, OF VERDI, NEVADA.

AIR-MOTOR.

SPECIFICATION forming part of Letters Patent No. 500,877, dated July 4, 1893.

Application filed March 9, 1892. Serial No. 424,333. (No model.)

*To all whom it may concern:*

Be it known that I, JOHN P. FOULKS, a citizen of the United States, residing at Verdi, county of Washoe, State of Nevada, have invented an Improvement in Air-Motors; and I hereby declare the following to be a full, clear, and exact description of the same.

My invention relates to a device which I term an "air motor."

It consists in certain details of construction which will be more fully explained by reference to the accompanying drawings, in which—

Figure 1:
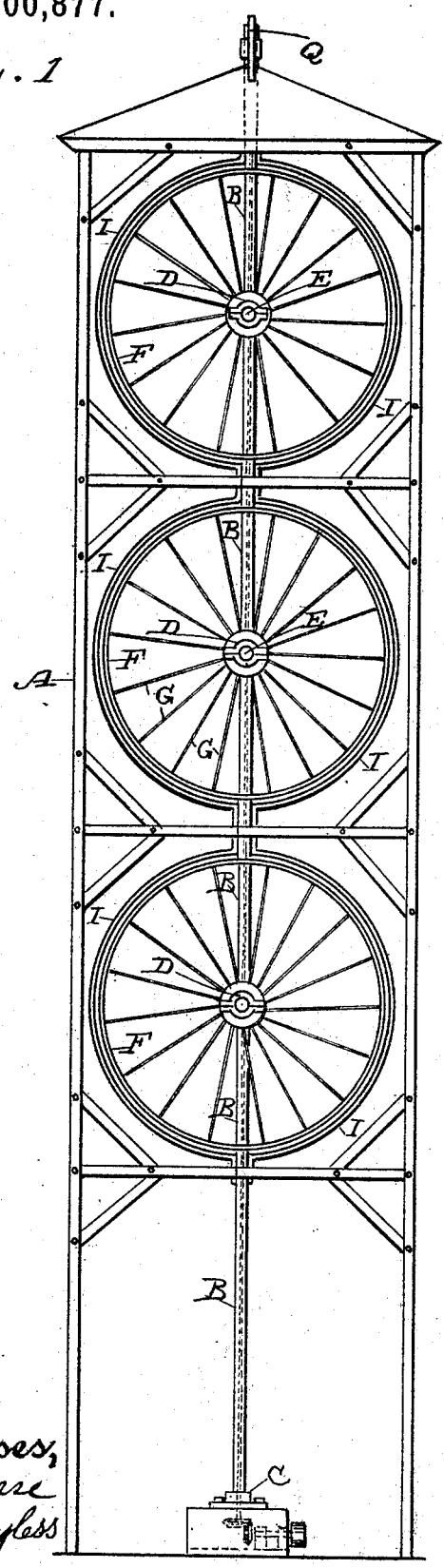
Figure 2:
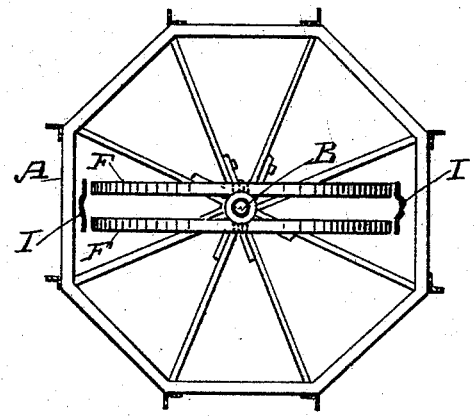
Figure 3:
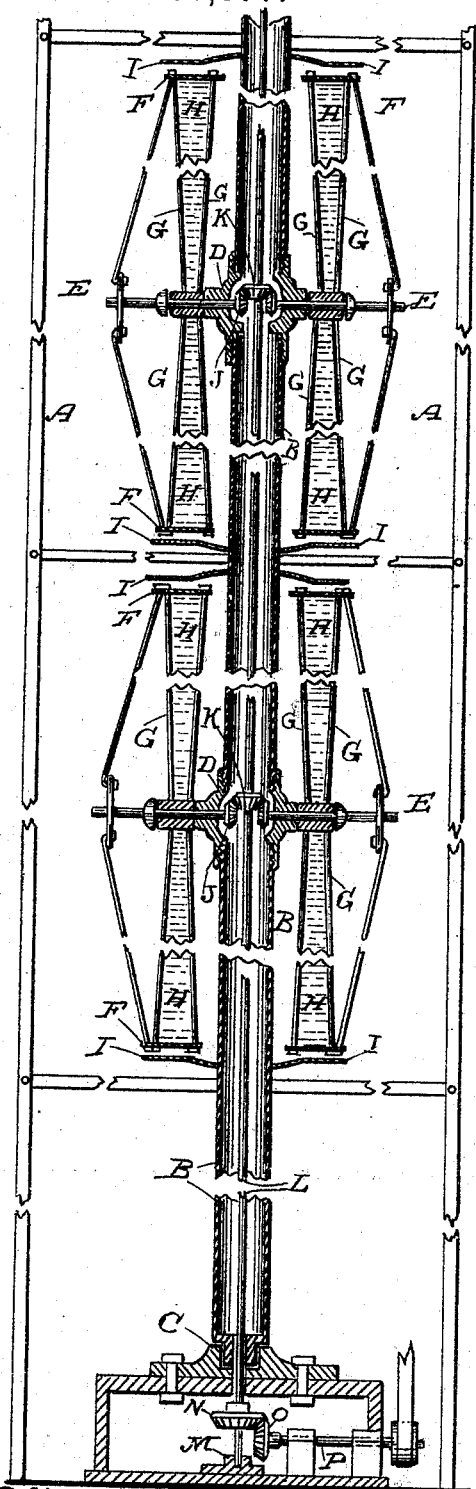
Figure 4:
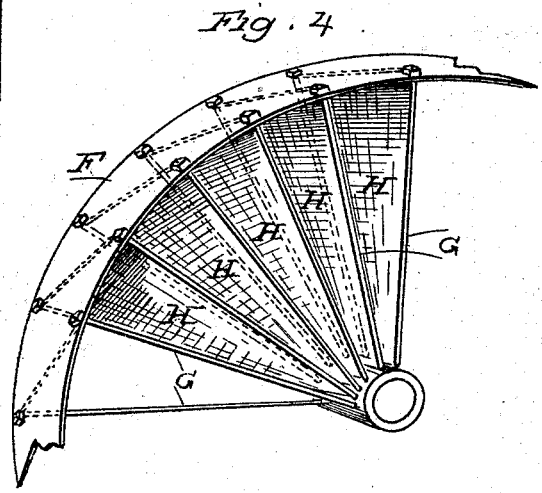
Figure 5:
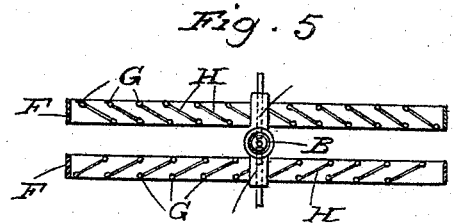

Figure 1 is a front elevation of one set of wheels. Fig. 2 is a horizontal section. Fig. 3 is an enlarged detailed section of the construction of the frame and wheels. Fig. 4 is a perspective view of a part of the wind wheels, showing the arrangement of the vanes. Fig. 5 is a horizontal sectional view of the wheels, showing the arrangement of the vanes.

The object of my invention is to provide for the unlimited application of the force of the wind, to drive a series of double wheels, and apply the power to a continuous shaft, so that the power may be increased by adding any number of wheels and connecting them with it. In carrying this out, I use a series of horizontally journaled double wheels, situated one above the other in one or more towers, and which are revoluble upon a central hollow axis for the purpose of presenting the wheels with their faces to the wind, or throwing them out, and a central shaft extending through these hollow shafts, receives motion from the wind wheels through suitable gearing, the motion of this shaft being again transmitted to a horizontal shaft which may receive the power of several sets of these wheels.

A is a tower which is made of any suitable or convenient materials, such as wood or angle iron, and suitably braced. Through the center of this tower runs a hollow vertical shaft B turning in a step C at the base. At sufficient intervals apart in the length of this hollow shaft are connected stout hollow boxes D having horizontal journals for the wind wheel shafts E and an interior chamber of sufficient size to contain the gears by which the power of these wheels is transmitted, as will be hereinafter described.

The wind wheels may be made of any suitable or desired form, but for lightness and ease of repair, I have in the present case shown them constructed of an exterior circular hoop F, having stout tension rods G extending radially from the rims to the hubs of the wheels to which they are secured.

The sails H are made of canvas or any flexible material and are stretched between the hub and the rim upon the wires or rods G so as to stand in an inclined position, or if preferred the wheels may be made in any usual manner with inflexible vanes. Two of these wheels are journaled upon opposite sides of the support D with the inclination of their vanes or sails in opposite directions, as plainly shown in Fig. 4. As many pairs of these wheels may thus be journaled one above the other as the length of the vertical shaft B is designed for, and each pair of the wheels is surrounded by a casing I which confines the current of air passing through these two wheels so that it acts first upon one of the wheels the one facing the wind, and being deflected from this wheel it strikes the wheel in the rear, the vanes of which are set at the opposite inclination and causes that wheel to revolve in the opposite direction. The inner ends of the shafts E extend through the supporting casing D and carry upon them beveled gears J. These gears both engage a gear wheel K which is fixed upon a vertical shaft L journaled within the hollow shaft B, and turning in a step M at the base, and below the step C of the hollow shaft as shown plainly in Fig. 5. It will be manifest that the two wheels H of each set, turning in opposite directions and standing upon opposite sides of the vertical shaft L, will act through their beveled gears J upon the gear K from opposite sides, so that the power of the two wheels will be applied to turn the shaft L in one direction. It will be manifest from the construction here shown that as many of these wheels may be connected with the vertical hollow shaft B as the height of the shaft and the diameter of the wheels will admit, and each set of wheels will add something to the power which is applied to rotate the vertical inner shaft L, thus concentrating upon this shaft the power of as many wheels as may be desirable. The lower end of the shaft L carries a beveled gear N, which engages a corresponding beveled gear O upon the horizontal shaft P, and from this shaft power may be transmitted by belt pulleys, gears or other mechanism to any desired point.

If it is desired to increase the power beyond that which can be applied by the set of wheels running in one of the towers A, it will only be necessary to erect as many of these towers and sets of wheels as may be desirable, extending along the line of the horizontal shaft B, and connecting with it in the same manner, these towers being set sufficiently far apart so that each set of the wheels will be acted upon by the wind. In this manner an almost unlimited amount of power may be applied through the single shaft for any desired purpose. As the vertical hollow shaft B in each of the towers is stepped so as to turn independently of the shaft L, it will be manifest that by applying a tail or vane Q of sufficient size to the top of this shaft, the shaft will be turned so as to present the wheels with their faces toward the wind. The tendency, however, of the gears J of the horizontal wind wheel shafts turning upon the gear K of the vertical shaft L would be to turn the mill around this shaft, provided the shaft L is held stationary, and this tendency will be strong in proportion to the friction and resistance offered to the rotation of the shaft L. It will thus be seen that the tendency of the gears to cause the mill to rotate around this vertical shaft will be resisted by the action of the wind upon the tail vane, and by means of a suitable brake or other device so much resistance can be brought upon the main driving shaft as to turn the wheels out of the wind whenever desired so that the mill may be easily regulated.

It will be manifest that the towers with their sets of wheels may, if desired, be set upon a turn-table so that they may be turned to face a wind from any direction. They may also be set in any desired relation with each other, either in straight lines or circularly.

Having thus described my invention, what I claim as new, and desire to secure by Letters Patent, is—

1. In an air motor, a vertical hollow post turning in a step at the bottom, horizontal journal boxes projecting in pairs from opposite sides of the hollow post, wind wheels having vanes at opposite angles and fixed to independent shafts which are journaled in the boxes upon the upright tubular post, a vertical central shaft extending upwardly within the tubular post and having an independent step below, bevel gears fixed to the vertical central shaft and engaging corresponding gears upon the wheel shafts, and cylindrical casings surrounding each pair of wheels and fixed to the tubular post, substantially as herein described.

2. In an air motor, a vertical hollow post turning in a step at the bottom wind wheels with oppositely placed vanes fixed to shafts which turn in horizontal journal boxes arranged in pairs upon opposite sides of the post, chambers within the post to contain bevel gears fixed to the inner ends of the wheel shafts, a vertical central shaft extending between the wheel shafts within the post and having bevel gears fixed to it to engage with those of the wheel shafts, and a second horizontal shaft with bevel gears by which the power of several independent sets of wheels may be applied to a single shaft, substantially as herein described.

In witness whereof I have hereunto set my hand.

JOHN P. FOULKS.

Witnesses:
S. H. NOURSE,
J. A. BAYLESS.